United States Patent
Tanuma

(10) Patent No.: US 8,535,847 B2
(45) Date of Patent: Sep. 17, 2013

(54) MEMBRANE/ELECTRODE ASSEMBLY FOR POLYMER ELECTROLYTE FUEL CELL

(75) Inventor: Toshihiro Tanuma, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 320 days.

(21) Appl. No.: 12/910,935

(22) Filed: Oct. 25, 2010

(65) Prior Publication Data

US 2011/0039189 A1    Feb. 17, 2011

Related U.S. Application Data

(63) Continuation of application No. PCT/JP2009/060395, filed on Jun. 5, 2009.

(30) Foreign Application Priority Data

Jun. 9, 2008 (JP) .................................. 2008-150319

(51) Int. Cl.
*H01M 8/10* (2006.01)
(52) U.S. Cl.
USPC .............................. 429/481; 429/482; 429/483
(58) Field of Classification Search
None
See application file for complete search history.

(56) References Cited

U.S. PATENT DOCUMENTS

| | | | | |
|---|---|---|---|---|
| 6,156,449 A * | 12/2000 | Zuber et al. | .................. | 429/480 |
| 6,350,539 B1 * | 2/2002 | Wood et al. | .................. | 429/450 |
| 6,572,997 B1 * | 6/2003 | Iqbal et al. | .................. | 429/518 |
| 2005/0084742 A1 * | 4/2005 | Angelopoulos et al. | ........ | 429/44 |
| 2005/0214611 A1 * | 9/2005 | Hommura | ....................... | 429/30 |
| 2005/0260476 A1 | 11/2005 | Xie | | |
| 2006/0237693 A1 * | 10/2006 | O'Hara | ......................... | 252/500 |
| 2007/0231696 A1 * | 10/2007 | Yazami et al. | ............. | 429/231.7 |
| 2008/0223516 A1 | 9/2008 | Tanuma | | |
| 2010/0003400 A1 | 1/2010 | Tanuma | | |
| 2010/0159301 A1 | 6/2010 | Tanuma | | |

FOREIGN PATENT DOCUMENTS

| | | |
|---|---|---|
| EP | 1 598 890 | 11/2005 |
| JP | 2001-160398 | 6/2001 |
| JP | 2002-313365 | 10/2002 |
| JP | 2004-220843 | 8/2004 |

(Continued)

OTHER PUBLICATIONS

U.S. Appl. No. 12/859,304, filed Aug. 19, 2010, Tanuma.
U.S. Appl. No. 12/641,960, filed Dec. 18, 2009, Tanuma.
U.S. Appl. No. 12/512,122, filed Jul. 30, 2009, Tanuma.

(Continued)

*Primary Examiner* — Patrick Ryan
*Assistant Examiner* — Jose Colucci Rios
(74) *Attorney, Agent, or Firm* — Oblon, Spivak, McClelland, Maier & Neustadt, L.L.P.

(57) ABSTRACT

A membrane electrode assembly less susceptible to flooding or shortcircuiting caused by piercing of carbon fibers of a gas diffusion layer to a polymer electrolyte membrane is provided, containing a cathode having a catalyst layer and a gas diffusion layer, an anode having a catalyst layer and a gas diffusion layer, and a polymer electrolyte membrane interposed between the catalyst layer of the cathode and the catalyst layer of the anode, wherein each of the cathode and the anode further has a protective layer containing carbon fibers having an average fiber diameter of from 1 to 30 μm and a fluorinated ion exchange resin, between the catalyst layer and the gas diffusion layer, and the mass ratio (F/C) of the fluorinated ion exchange resin (F) to the carbon fibers (C) contained in the protective layer is from 0.05 to 0.30.

9 Claims, 3 Drawing Sheets

(56) References Cited

FOREIGN PATENT DOCUMENTS

| | | | |
|---|---|---|---|
| JP | 2005-216834 | | 8/2005 |
| JP | 2007-194004 | | 8/2007 |
| JP | 2008-016431 | | 1/2008 |
| WO | WO 2007/052650 | * | 5/2007 |

OTHER PUBLICATIONS

U.S. Appl. No. 12/110,396, filed Apr. 28, 2008, Tanuma.
International Search Report issued Sep. 17, 2008 in PCT/JP09/060395 filed Oct. 6, 2009.
U.S. Appl. No. 13/599,425, filed Aug. 30, 2012, Tanuma.

* cited by examiner

MEMBRANE/ELECTRODE ASSEMBLY FOR POLYMER ELECTROLYTE FUEL CELL

TECHNICAL FIELD

The present invention relates to a membrane/electrode assembly for a polymer electrolyte fuel cell.

BACKGROUND ART

Fuel cells are expected to be commonly used in future since they have high power generation efficiency and present little burden on the environment as the reaction product is only water in principle. Among them, polymer electrolyte fuel cells have high output densities and thus are expected to be widely used as distributed power generation systems for automobiles, mobile power generation systems and domestic co-generation systems.

A polymer electrolyte fuel cell is usually composed of a cell wherein an electrically conductive separator provided with gas flow paths is disposed on each side of a membrane/electrode assembly comprising a cathode having a catalyst layer and a gas diffusion layer, an anode having a catalyst layer and a gas diffusion layer and a polymer electrolyte membrane disposed between the catalyst layer of the cathode and the catalyst layer of the anode.

As the gas diffusion layer, a gas diffusing base material having carbon fibers integrated (such as carbon paper, carbon cloth or carbon felt) is usually employed. However, if carbon fibers become fluffy on the surface of the gas diffusing base material, such carbon fibers are likely to pierce the catalyst layer adjacent to the gas diffusion layer and further pierce the polymer electrolyte membrane, thus causing shortcircuiting, etc.

For example, the following one has been proposed as a membrane/electrode assembly whereby a damage of the polymer electrolyte membrane by carbon fibers of the gas diffusion layer is prevented.

A membrane/electrode assembly having a protective adhesive layer comprising electrically conductive carbon particles (such as Ketjen black or acetylene black) and a fluorinated ion exchange resin, between the catalyst layer and the gas diffusion layer (Patent Document 1).

However, in such a membrane/electrode assembly, if the length of fluffy carbon fibers on the surface of the gas diffusing base material is longer than the thickness of the protective adhesive layer, such carbon fibers are likely to pierce through the protective adhesive layer into the polymer electrolyte membrane. Further, such a protective adhesive layer has small pores and poor water drainage and thus is susceptible to clogging (flooding) of pores due to condensation of steam.

PRIOR ART DOCUMENT

Patent Document
  Patent Document 1: JP-A-2005-216834

DISCLOSURE OF THE INVENTION

Object to be Accomplished by the Invention

The present invention is to provide a membrane/electrode assembly which is less susceptible to shortcircuiting and flooding caused by piercing of carbon fibers of a gas diffusion layer to the polymer electrolyte membrane.

Means to Accomplish the Object

The present invention provides a membrane/electrode assembly for a polymer electrolyte fuel cell, comprising a cathode having a catalyst layer and a gas diffusion layer, an anode having a catalyst layer and a gas diffusion layer, and a polymer electrolyte membrane interposed between the catalyst layer of the cathode and the catalyst layer of the anode, wherein each of the cathode and the anode further has a protective layer comprising carbon fibers having an average fiber diameter of from 1 to 30 µm and a fluorinated ion exchange resin, between the catalyst layer and the gas diffusion layer, and the mass ratio (F/C) of the fluorinated ion exchange resin (F) to the carbon fibers (C) contained in the protective layer is from 0.05 to 0.30.

The above protective layer preferably has a thickness of from 15 to 80 µm.

It is preferred that at least one of the cathode and the anode further has a bonding and drainage layer comprising carbon fibers having an average fiber diameter of from 1 to 200 nm between the catalyst layer and the protective layer.

It is preferred that at least one of the cathode and the anode further has a microporous layer comprising carbon particles, between the protective layer and the gas diffusion layer.

Advantageous Effects of the Invention

The membrane/electrode assembly for a polymer electrolyte fuel cell of the present invention is less susceptible to shortcircuiting and flooding due to piercing of carbon fibers of the gas diffusion layer to the polymer electrolyte membrane.

BEST MODE FOR CARRYING OUT THE INVENTION

In this specification, repeating units represented by the formula (1) will be referred to as units (1). Repeating units represented by other formulae will be referred to in the same manner. Repeating units mean units derived from a monomer, formed by polymerization of such a monomer. The repeating units may be units formed directly by a polymerization reaction or such that by treatment of a polymer, some of such units are converted to another structure.

Further, in this specification, a compound represented by the formula (2) will be referred to as a compound (2). Compounds represented by other formulae will be referred to in the same manner.

<Membrane/Electrode Assembly>

Figure 1:
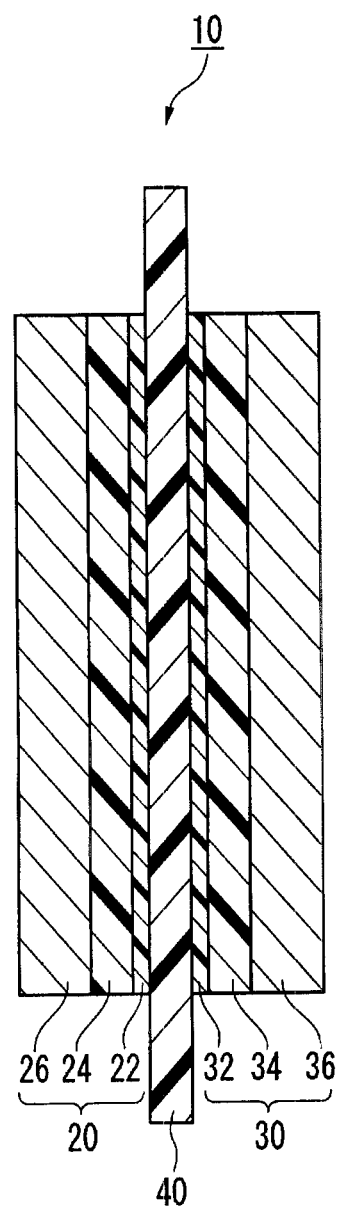
FIG. 1 is a cross-sectional view illustrating an embodiment of the membrane/electrode assembly of the present invention.

FIG. 1 is a cross-sectional view illustrating one embodiment of the membrane/electrode assembly of the present invention. The membrane/electrode assembly 10 comprises a cathode 20 having a catalyst layer 22, a protective layer 24 and a gas diffusion layer 26 in this order; an anode 30 having a catalyst layer 32, a protective layer 34 and a gas diffusion layer 36 in this order; and a polymer electrolyte membrane 40 disposed between the catalyst layer 22 of the cathode 20 and the catalyst layer 32 of the anode 30.

(Catalyst Layer)

The catalyst layer 22 or the catalyst layer 32 (which may be hereinafter generally referred to as a catalyst layer) is a layer comprising a catalyst and an ion exchange resin. The catalyst layer 22 and the catalyst layer 32 may be the same layers or different layers with respect to the components, composition, thickness, etc.

The catalyst may be any catalyst so long as it is one to accelerate an oxidation/reduction reaction in a fuel cell, and it is preferably a catalyst containing platinum, particularly preferably a supported catalyst having platinum or a platinum alloy supported on a carbon carrier.

The carbon carrier may, for example, be activated carbon or carbon black, and it is preferably graphitized by e.g. heat treatment, since its chemical durability is high.

The specific surface area of the carbon carrier is preferably at least 200 $m^2/g$. The specific surface area of the carbon carrier is measured by a BET specific surface area device by adsorption of nitrogen on a carbon surface.

The platinum alloy is preferably an alloy of platinum with at least one metal selected from the group consisting of platinum group metals excluding platinum (such as ruthenium, rhodium, palladium, osmium and iridium), gold, silver, chromium, iron, titanium, manganese, cobalt, nickel, molybdenum, tungsten, aluminum, silicon, zinc and tin. Such a platinum alloy may contain an intermetallic compound of platinum and a metal to be alloyed with platinum.

The amount of platinum or a platinum alloy supported is preferably from 10 to 70 mass %, based on the supported catalyst (100 mass %).

The ion exchange resin is preferably a fluorinated ion exchange resin, more preferably a perfluorocarbon polymer having ionic groups (which may contain an etheric oxygen atom), from the viewpoint of the durability. As such a perfluorocarbon polymer, polymer (H) or polymer (Q) is particularly preferred.

Polymer (H):

The polymer (H) is a copolymer having units based on tetrafluoroethylene (hereinafter referred to as TFE) and units (1).

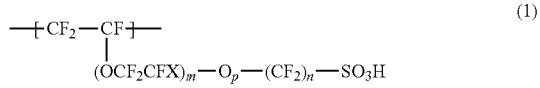
(1)

wherein X is a fluorine atom or a trifluoromethyl group, m is an integer of from 0 to 3, n is an integer of from 1 to 12, and p is 0 or 1.

The polymer (H) is obtainable by polymerizing a mixture of TFE and the compound (2) to obtain a precursor polymer (hereinafter referred to as polymer (F)), and then converting the —$SO_2F$ groups in the polymer (F) to sulfonic acid groups. The conversion of the —$SO_2F$ groups to the sulfonic acid groups is carried out by hydrolysis and is followed by conversion to an acid-form.

$$CF_2=CF(OCF_2CFX)_m-O_p-(CF_2)_n-SO_2F \quad (2)$$

wherein X is a fluorine atom or a trifluoromethyl group, m is an integer of from 0 to 3, n is an integer of from 1 to 12, and p is 0 or 1.

As the compound (2), compounds (2-1) to (2-3) are preferred.

$$CF_2=CFO(CF_2)_{n1}SO_2F \quad (2\text{-}1)$$

$$CF_2=CFOCF_2CF(CF_3)O(CF_2)_{n2}SO_2F \quad (2\text{-}2)$$

$$CF_2=CF(OCF_2CF(CF_3))_{m3}O(CF_2)_{n3}SO_2F \quad (2\text{-}3)$$

wherein each of n1, n2 and n3 is an integer of from 1 to 8, and m3 is an integer of from 1 to 3.

Polymer (Q):

The polymer (Q) is a copolymer having units (U1) and units (U2).

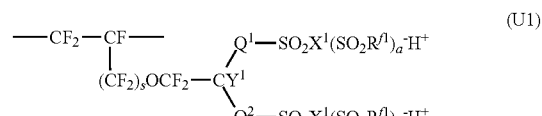
(U1)

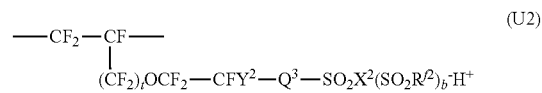
(U2)

wherein $Q^1$ is a perfluoroalkylene group which may have an etheric oxygen atom, $Q^2$ is a single bond or a perfluoroalkylene group which may have an etheric oxygen atom, $R^{f1}$ is a perfluoroalkyl group which may have an etheric oxygen atom, $X^1$ is an oxygen atom, a nitrogen atom or a carbon atom, a is 0 when $X^1$ is an oxygen atom, 1 when $X^1$ is a nitrogen atom, and 2 when $X^1$ is a carbon atom, $Y^1$ is a fluorine atom or a monovalent perfluoro organic group, s is 0 or 1, $Q^3$ is a single bond or a perfluoroalkylene group which may have an etheric oxygen atom, $R^{f2}$ is a perfluoroalkyl group which may have an etheric oxygen atom, $X^2$ is a hydrogen atom, a nitrogen atom or a carbon atom, b is 0 when $X^2$ is an oxygen atom, 1 when $X^2$ is a nitrogen atom, and 2 when $X^2$ is a carbon atom, $Y^2$ is a fluorine atom or a monovalent perfluoro organic group, and t is 0 or 1.

The single bond means that the carbon atom of $CY^1$ or $CY^2$ is directly bonded to the sulfur atom of $SO_2$.

The organic group means a group containing at least one carbon atom.

Units (U1):

In a case where the perfluoroalkylene group for $Q^1$ or $Q^2$ has an etheric oxygen atom, the number of such oxygen atoms may be one or more. Further, such an oxygen atom may be inserted in a carbon atom-carbon atom bond of the perfluoroalkylene group, or may be inserted at the terminal of a carbon atom bond.

The perfluoroalkylene group may be linear or branched, preferably linear. The number of carbon atoms in the perfluoroalkylene group is preferably from 1 to 6, more preferably from 1 to 4. When the number of carbon atoms is at most 6, the boiling point of the fluoromonomer as the starting material tends to be low, whereby purification by distillation will be easy. Further, when the number of carbon atoms is at most 6, it is possible to suppress an increase of the equivalent weight of the polymer (Q) and to suppress a decrease of the proton conductivity.

$Q^2$ is preferably a $C_{1-6}$ perfluoroalkylene group which may have an etheric oxygen atom. When $Q^2$ is a $C_{1-6}$ perfluoroalkylene group which may have an etheric oxygen atom, the polymer electrolyte fuel cell will be excellent in the stability of the power generation performance when it is operated over a long period, as compared with a case where $Q^2$ is a single bond.

It is preferred that at least one of $Q^1$ and $Q^2$ is a $C_{1-6}$ perfluoroalkylene group having an etheric oxygen atom. The fluorinated monomer having a $C_{1-6}$ perfluoroalkylene group having an etheric oxygen atom can be synthesized without a fluorination reaction by fluorine gas, whereby the yield is good, and the production is easy.

The perfluoroalkyl group for $R^{f1}$ may be linear or branched, preferably linear.

The number of carbon atoms in the perfluoroalkyl group is preferably from 1 to 6, more preferably from 1 to 4. The perfluoroalkyl group is preferably a perfluoromethyl group, a perfluoroethyl group or the like.

In a case where units (U1) have at least two $R^{f1}$, the plurality of $R^{f1}$ may be the same or different from one another.

The $-(SO_2X^1(SO_2R^{f1})_a)^-H^+$ group is an ionic group.

The $-(SO_2X^1(SO_2R^{f1})_a)^-H^+$ group may, for example, be a sulfonic acid group ($-SO_3^-H^+$ group), a sulfonimide group ($-SO_2N(SO_2R^{f1})^-H^+$ group), or a sulfonmethide group ($-SO_2C(SO_2R^{f1})_2)^-H^+$ group).

$Y^1$ is preferably a fluorine atom or a $C_{1-6}$ linear perfluoroalkyl group which may have an etheric oxygen atom.

Units (U1) are preferably units (M1), more preferably units (M11), units (M12) or units (M13), since production of the polymer (Q) is thereby easy, and industrial application is easy.

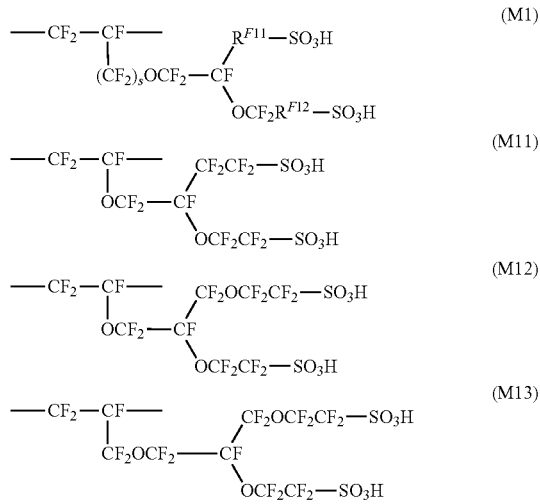

wherein $R^{F11}$ is a single bond or a $C_{1-6}$ linear perfluoroalkylene group which may have an etheric oxygen atom, and $R^{F12}$ is a $C_{1-6}$ linear perfluoroalkylene group.

Units (U2):

In a case where the perfluoroalkylene group for $Q^3$ has an etheric oxygen atom, the number of such oxygen atoms may be one or more. Further, such an oxygen atom may be inserted in a carbon atom-carbon atom bond of the perfluoroalkylene group, or may be inserted at the terminal of a carbon atom bond.

The perfluoroalkylene group may be liner or branched.

The number of carbon atoms in the perfluoroalkylene group is preferably from 1 to 6, more preferably from 1 to 4. When the number of carbon atoms is at most 6, an increase of the equivalent weight of the polymer (Q) can be suppressed, and a decrease of the proton conductivity can be suppressed.

The perfluoroalkyl group for $R^{f2}$ may be linear or branched, preferably linear.

The number of carbon atoms in the perfluoroalkyl group is preferably from 1 to 6, more preferably from 1 to 4. The perfluoroalkyl group is preferably, for example, a perfluoromethyl group or a perfluoroethyl group.

The $-(SO_2X^2(SO_2R^{f2})_b)^-H^+$ group is an ionic group.

The $-(SO_2X^2(SO_2R^{f2})_b)^-H^+$ group may, for example, be a sulfonic acid group ($-SO_3^-H^+$ group), a sulfonimide group ($-SO_2N(SO_2R^{f2})^-H^+$ group), or a sulfonmethide group ($-SO_2C(SO_2R^{f2})_2)^-H^+$ group).

$Y^2$ is preferably a fluorine atom or a trifluoromethyl group.

Units (U2) are preferably units (M2), more preferably units (M21), units (M22), units (M23) or units (M24) from such a viewpoint that production of the polymer (Q) is easy, and an industrial application is easy.

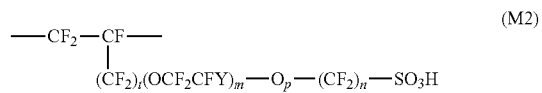

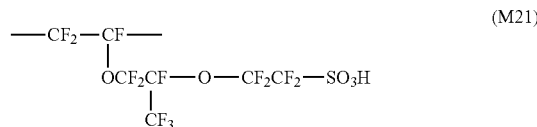

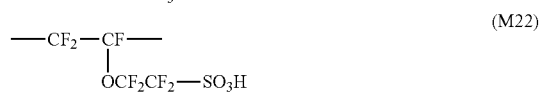

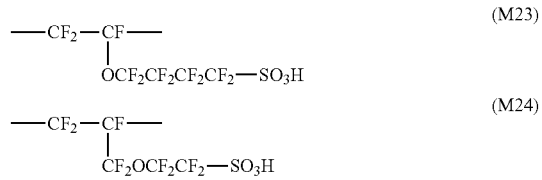

wherein Y is a fluorine atom or a trifluoromethyl group, m is an integer of from 0 to 3, n is an integer of from 1 to 12, and p is 0 or 1, provided that m+p>0.

Other Units:

The polymer (Q) may further have repeating units based on the after-described other monomers (hereinafter referred to as other units). The proportion of such other units may suitably be adjusted so that the equivalent weight of the polymer (Q) will be within the after-mentioned preferred range.

Such other units are preferably repeating units based on a perfluoromonomer, more preferably repeating units based on TFE, from the viewpoint of mechanical strength and chemical durability.

The proportion of repeating units based on TFE is preferably at least 20 mol %, more preferably at least 40 mol %, based on the total repeating units (100 mol %) constituting the polymer (Q), from the viewpoint of the mechanical strength and chemical durability.

The proportion of repeating units based on TFE is preferably at most 92 mol %, more preferably at most 87 mol %, based on the total repeating units (100 mol %) constituting the polymer (Q) from the viewpoint of the electrical resistance.

The polymer (Q) may have units (U1), units (U2) and other units, each being one type only, or two or more types. The polymer (Q) is preferably a perfluoropolymer from the viewpoint of the chemical durability.

The equivalent weight of the polymer (Q) (grams of polymer per equivalent of ionic groups, hereinafter referred to as EW) is preferably from 400 to 900 g·dry resin/equivalent (hereinafter referred to as g/equivalent), more preferably from 500 to 800 g/equivalent, further preferably from 550 to 780 g/equivalent, particularly preferably from 580 to 750 g/equivalent. When EW is at most 900 g/equivalent, the proton conductivity will be high (the electrical resistance will be low), whereby a sufficient cell output can be obtained. When EW is at least 400 g/equivalent, it is easy to synthesize a polymer having a high molecular weight, or the polymer (Q)

will not be excessively swelled with water, whereby the mechanical strength can be maintained.

EW of a polymer which has been heretofore commonly used is at a level of from 900 to 1,100 g/equivalent from the balance of the electrical resistance and the mechanical strength. On the other hand, with the polymer (Q), the mechanical strength can be maintained even when the electrical resistance is lowered by reducing EW.

When the proportion of units (U2) in the polymer (Q) is represented by units (U2)/(units (U1)+units (U2)) (molar ratio), it is preferably from 0.2 to 0.7, more preferably from 0.25 to 0.6, further preferably from 0.3 to 0.55. When the proportion of units (U2) is at least 0.2, the durability against repetition of moistening and drying will be high, and the polymer electrolyte fuel cell will be operated stably over a long period of time. When the proportion of units (U2) is at most 0.7, the water content will not be too high, or the softening point and the glass transition temperature will not be too low, whereby the mechanical strength can be maintained.

The mass average molecular weight of the polymer (Q) is preferably from $1\times10^4$ to $1\times10^7$, more preferably from $5\times10^4$ to $5\times10^6$, further preferably from $1\times10^5$ to $3\times10^6$. When the mass average molecular weight of the polymer (Q) is at least $1\times10^4$, the physical properties such as the swelling degree, etc. will scarcely change with time, and the durability will be sufficient. When the mass average molecular weight of the polymer (Q) is at most $1\times10^7$, dissolution and molding will be easy.

The mass average molecular weight of the polymer (Q) can be evaluated by measuring the TQ value of the precursor polymer having the —$SO_2F$ groups. The TQ value (unit: ° C.) is an index of the molecular weight of a polymer and is a temperature when the extruded amount would be 100 $mm^3$/sec when melt extrusion of the precursor polymer is carried out under an extrusion pressure condition of 2.94 MPa by using a nozzle having a length of 1 mm and an inner diameter of 1 mm. For example, with a polymer having a TQ value of from 200 to 300° C., its mass average molecular weight corresponds to from $1\times10^5$ to $1\times10^6$, although it may vary depending upon the composition of repeating units constituting the polymer.

The ion exchange capacity of the fluorinated ion exchange resin is preferably from 0.5 to 2.0 meq/g dry resin, particularly preferably from 0.8 to 1.5 meq/g dry resin, from the viewpoint of the electrical conductivity and gas permeability.

The mass ratio of the fluorinated ion exchange resin in the catalyst layer to the carbon in the catalyst (i.e. fluorinated ion exchange resin/carbon in the catalyst) is preferably from 0.4 to 1.6, particularly preferably from 0.6 to 1.2, from the viewpoint of the power generation performance of the fuel cell.

The amount of platinum contained in the catalyst layer is preferably from 0.01 to 0.5 $mg/cm^2$ from the viewpoint of the optimum thickness to carry out the electrode reaction efficiently, more preferably from 0.05 to 0.35 $mg/cm^2$ from the viewpoint of the balance of the cost of materials and the performance.

The thickness of the catalyst layer is preferably at most 20 μm, more preferably from 1 to 15 μm, with a view to facilitating the gas diffusion in the catalyst layer and improving the power generation performance of the polymer electrolyte fuel cell. Further, the thickness of the catalyst layer is preferably uniform. If the thickness of the catalyst layer is made thin, the amount of the catalyst present per unit area decreases, and the reaction activity is likely to be low. In such a case, a supported catalyst may be employed wherein platinum or a platinum alloy is supported at a high supported ratio, even if the thickness is thin, it is possible to maintain the reaction activity of the electrode to be high without deficiency of the catalyst amount.

The thickness of the catalyst layer is measured by observing a cross section of the catalyst layer by e.g. SEM (scanning electron microscope).

(Protective Layer)

The protective layer 24 or the protective layer 34 (which may be hereinafter generally referred to as a protective layer) is a layer comprising carbon fibers having an average fiber diameter of from 1 to 30 μm and a fluorinated ion exchange resin. The protective layer 24 and the protective layer 34 may be the same layers or different layers with respect to the components, composition, thickness, etc.

The carbon fibers contained in the protective layer may, for example, be PAN-type carbon fibers or pitch-type carbon fibers.

The carbon fibers may be in the form of chopped fibers or milled fibers.

The average fiber diameter of the carbon fibers contained in the protective layer is from 1 to 30 μm, preferably from 3 to 25 μm, more preferably from 5 to 20 μm. When the average particle diameter of the carbon fibers is at least 1 μm, the carbon fibers of the gas diffusion layer tend to be less likely to penetrate therethrough. Further, the protective layer formed by using a coating liquid has good gas diffusing properties and water drainage properties. When the average fiber diameter of the carbon fibers is at most 30 μm, the carbon fibers can be dispersed well in a dispersing medium.

As the fluorinated ion exchange resin contained in the protective layer, a perfluoropolymer having ion exchange groups is preferred, and the above-mentioned polymer (H) or polymer (Q) is particularly preferred. In a case where the ion exchange resin contained in the catalyst layer is a fluorinated ion exchange resin, the fluorinated ion exchange resin contained in the protective layer may be the same as or different from the fluorinated ion exchange resin contained in the catalyst layer.

The ion exchange capacity of the fluorinated ion exchange resin is preferably from 0.5 to 2.0 meq/g, particularly preferably from 0.8 to 1.5 meq/g, from the viewpoint of the electrical conductivity and gas permeability.

The mass ratio (F/C) of the fluorinated ion exchange resin (F) to the carbon fibers (C) contained in the protective layer is from 0.05 to 0.30, preferably from 0.1 to 0.2. When F/C is at least 0.05, the carbon fibers can be dispersed well in a dispersing medium. When the amount of the fluorinated ion exchange resin is at most 0.30, the protective layer formed by using a coating liquid will have good gas dispersing properties and water drainage properties.

The thickness of the protective layer is preferably from 15 to 80 μm, more preferably from 20 to 50 μm. When the thickness of the protective layer is at least 15 μm, carbon fibers of the gas diffusion layer tend to hardly penetrate therethrough. When the thickness of the protective layer is at most 80 μm, the protective layer formed by using a coating liquid will have good gas diffusing properties and water drainage properties.

The thickness of the protective layer is measured by observing the cross section of the protective layer by means of e.g. SEM.

(Gas Diffusion Layer)

The gas diffusion layer 26 or the gas diffusion layer 36 (which may be hereinafter generally referred to as a gas diffusion layer) is a layer made of a gas diffusing base material. The gas diffusion layer 26 and the gas diffusion layer 36 may be the same layers or different layers with respect to the components, composition, thickness, etc.

The gas diffusing base material may, for example, be carbon paper, carbon cloth or carbon felt.

The thickness of the gas diffusion layer is preferably from 100 to 400 µm, more preferably from 120 to 300 µm.

For the thickness of the gas diffusion layer, thicknesses at four portions are measured by means of a Digimatic Indicator (543-250, manufactured by MITUTOYO CORPORATION, flat measuring terminal: 5 mm in diameter), and they are averaged to obtain the thickness of the gas diffusion layer.

(Bonding and Drainage Layer)

Figure 2:
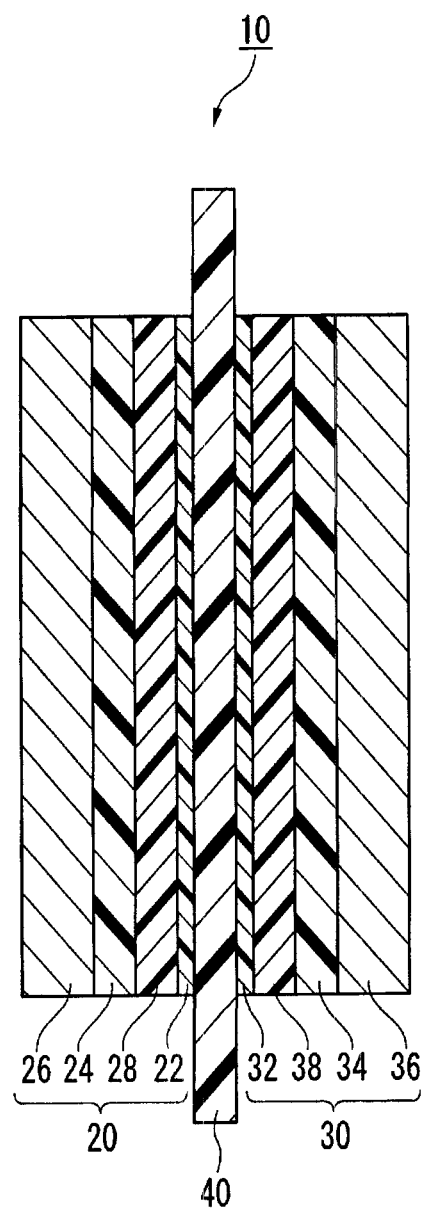
FIG. 2 is a cross-sectional view illustrating another embodiment of the membrane/electrode assembly of the present invention.

As shown in FIG. 2, the membrane/electrode assembly of the present invention may have a bonding and drainage layer 28 or 38 (which may be hereinafter generally referred to as a bonding and drainage layer) comprising carbon fibers having an average fiber diameter of from 1 to 200 nm and an ion exchange resin, between a catalyst layer and a protective layer. The bonding and drainage layer 28 and the bonding and drainage layer 38 may be the same layers or different layers with respect to the components, composition, thickness, etc.

By providing a bonding and drainage layer composed mainly of carbon fibers having an average fiber diameter of from 1 to 200 nm, between the catalyst layer and the protective layer, water tends to readily move by a capillary phenomenon from the catalyst layer to the protective layer, whereby a problem of flooding during the operation of the polymer electrolyte fuel cell can easily be solved.

As carbon fibers to be contained in the bonding and drainage layer, carbon nanofibers are preferred, since they are fine and have high electron conductivity. The carbon nanofibers may, for example, be carbon fibers grown in gas phase or carbon nanotubes (such as single wall, double wall, multi wall, cup lamination type, etc.).

The average fiber diameter of the carbon fibers contained in the bonding and drainage layer is from 1 to 200 nm, preferably from 10 to 180 nm. Within such a range, the carbon fibers are mutually entangled one another to form void spaces not to fill porous voids spaces, whereby the high gas diffusing properties and water drainage properties can be maintained.

As the ion exchange resin to be contained in the bonding and drainage layer, a fluorinated ion exchange resin is preferred.

The fluorinated ion exchange resin is preferably a perfluorocarbon polymer having ionic groups (which may contain etheric oxygen atoms), particularly preferably the polymer (H) or the polymer (Q). In a case where the bonding and drainage layer contains a fluorinated ion exchange resin, such a fluorinated ion exchange resin may be the same as or different from the fluorinated ion exchange resin contained in the protective layer. Further, in a case where the bonding and drainage layer contains a fluorinated ion exchange resin, and the catalyst layer contains a fluorinated ion exchange resin, the fluorinated ion exchange resin contained in the bonding and drainage layer may be the same as or different from the fluorinated ion exchange resin contained in the catalyst layer.

Further, in a case where the bonding and drainage layer contains a fluorinated ion exchange resin, the mass ratio (f/c) of the fluorinated ion exchange resin (f) to the carbon fiber (c) contained in the bonding and drainage layer is preferably from 0.05 to 2, more preferably from 0.1 to 0.7. When f/c is at least 0.05, the dispersion stability will be high. When f/c is at most 2, there is no practical problem with respect to the electric conductivity of the coated layer. Within such a range, the gas diffusing properties, water drainage properties and adhesion to the catalyst layer or protective layer, of the bonding and drainage layer will be good.

The thickness of the bonding and drainage layer is preferably from 2 to 15 µm. Within such a range, the adhesion to the catalyst layer or protective layer will be good, and the contact resistance at such an interface can be made sufficiently small.

The thickness of the bonding and drainage layer is measured by observing the cross-section of the bonding and drainage layer by means of e.g. SEM.

The bonding and drainage layer may be provided on each of the cathode 20 and the anode 30, or may be provided on one of the cathode 20 and the anode 30. In a case where one of the cathode 20 and the anode 30 has a bonding and drainage layer, and the other has no bonding and drainage layer, it is preferred that the cathode 20 has the bonding and drainage layer.

(Microporous Layer)

Figure 3:
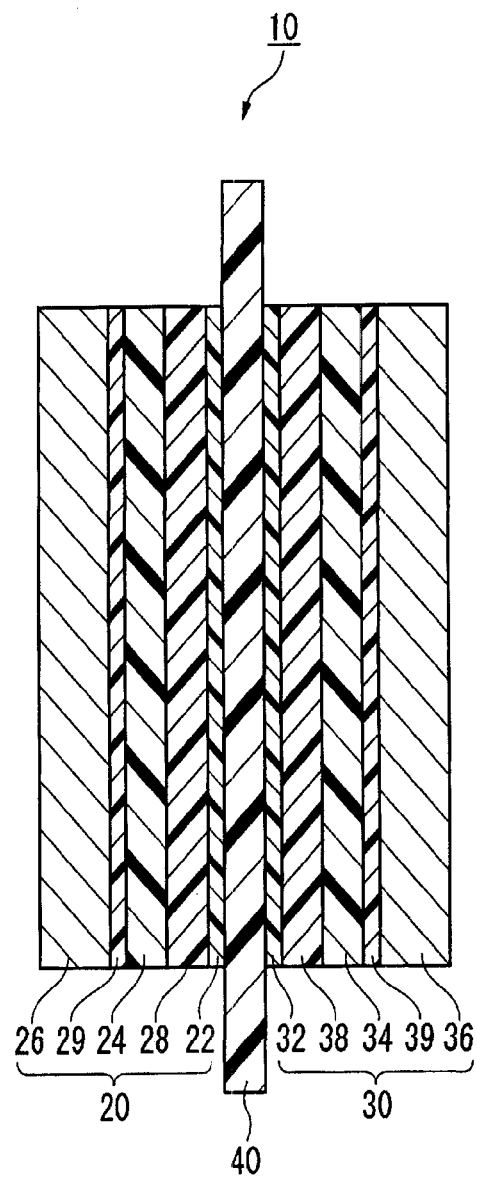
FIG. 3 is a cross-sectional view illustrating another embodiment of the membrane/electrode assembly of the present invention.

As shown in FIG. 3, the membrane/electrode assembly of the present invention may have a microporous layer 29 or 39 (which may be hereinafter generally referred to as a microporous layer) comprising carbon particles and a binder, between a protective layer and a gas diffusion layer. The microporous layer 29 and the microporous layer 39 may be the same layers or different layers with respect to the components, composition, thickness, etc.

By providing a microporous layer composed mainly of carbon particles between the protective layer and the gas diffusion layer, water tends to hardly clog pores of the gas diffusion layer, whereby it is possible to prevent deterioration of the gas diffusing properties.

The carbon particles contained in the microporous layer may, for example, be carbon black.

The binder to be contained in the microporous layer is preferably a water repellent fluorinated polymer, particularly preferably a polytetrafluoroethylene (PTFE).

The microporous layer may be provided on each of the cathode 20 and the anode 30, or may be provided on one of the cathode 20 and the anode 30. In a case where one of the cathode 20 and the anode 30 has a microporous layer, and the other has no microporous layer, it is preferred that the cathode 20 has the microporous layer.

(Polymer Electrolyte Membrane)

The polymer electrolyte membrane 40 is a membrane made of an ion exchange resin.

From the viewpoint of the durability, the ion exchange resin is preferably a fluorinated ion exchange resin, more preferably a perfluorocarbon polymer having ionic groups (which may have etheric oxygen atoms), further preferably the above-mentioned polymer (H) or polymer (Q).

The ion exchange capacity of the fluorinated ion exchange resin is preferably from 0.5 to 2.0 meq/g dry resin, particularly preferably from 0.8 to 1.5 meq/g dry resin.

The thickness of the polymer electrolyte membrane 40 is preferably from 10 to 30 µm, more preferably from 15 to 25 µm. When the thickness of the polymer electrolyte membrane 40 is at most 30 µm, it is possible to prevent deterioration of the power generation performance of the polymer electrolyte fuel cell under a low humidity condition. Further, by adjusting the thickness of the polymer electrolyte membrane 40 to be at least 10 µm, it is possible to prevent gas leakage or electrical shortcircuiting.

The thickness of the polymer electrolyte membrane 40 is measured by observing the cross-section of the polymer electrolyte membrane 40 by means of e.g. SEM.

(Process for Producing Membrane/Electrode Assembly)

As a process for producing the membrane/electrode assembly 10, the following processes (I) to (III) may, for example, be mentioned.

Process (I):

A process for producing the membrane/electrode assembly 10 as shown in FIG. 1 by carrying out the following steps (I-1) and (I-2) in this order.

(I-1) A step of applying the after-mentioned protective layer-forming coating liquid on the surface of a gas diffusing base material, followed by drying to obtain a laminate (A) comprising a gas diffusion layer and a protective layer.

(I-2) A step of bonding a membrane/catalyst layer assembly having a catalyst layer formed on each side of a polymer electrolyte membrane and two laminates (A), so that the catalyst layers of the membrane/catalyst layer assembly are in contact with the protective layers of the laminates (A).

As such a coating method, a known method may be employed.

The drying temperature is preferably from 40 to 130° C.

The bonding method may, for example, be a hot press method, a hot roll press method or an ultrasonic fusion method, and from the viewpoint of the in-plane uniformity, a hot press method is preferred.

The temperature of the pressing plate in the press machine is preferably from 100 to 150° C.

The pressing pressure is preferably from 0.5 to 4.0 MPa.

Process (II):

A process for producing the membrane/electrode assembly 10 as shown in FIG. 2 by carrying out the following steps (II-1) to (II-3) in this order.

(II-1) A step of applying the after-mentioned bonding and drainage layer-forming coating liquid on the surface of a release film, followed by drying to form a bonding and drainage layer.

(II-2) A step of applying the after-mentioned protective layer-forming coating liquid on the surface of the bonding and drainage layer, placing a gas diffusing base material on the coating liquid before drying the coating liquid, and then drying the coating liquid to obtain a laminate (B) comprising a gas diffusion layer, a protective layer and a bonding and drainage layer.

(II-3) A step of bonding a membrane/catalyst layer assembly having a catalyst layer formed on each side of a polymer electrolyte membrane and two laminates (B) so that the catalyst layers of the membrane/catalyst layer assembly are in contact with the bonding and drainage layers of the laminates (B).

The release film may, for example, be a polypropylene film, a polyethylene terephthalate (PET) film or an ethylene-TFE copolymer (ETFE) film.

The coating, drying and bonding may be carried out under the same conditions as in the process (I).

Process (III):

A process for producing the membrane/electrode assembly 10 as shown in FIG. 3 by carrying out the following steps (III-1) to (III-3) in this order.

(III-1) A step of applying the after-mentioned bonding and drainage layer-forming coating liquid on the surface of a release film, followed by drying to form a bonding and drainage layer.

(III-2) A step of applying the after-mentioned protective layer-forming coating liquid on the surface of the bonding and drainage layer, placing a gas diffusing base material (provided with a microporous layer) on the coating liquid before drying the coating liquid, and then drying the coating liquid to obtain a laminate (C) comprising a gas diffusion layer, a microporous layer, a protective layer and a bonding and drainage layer.

(III-3) A step of bonding a membrane/catalyst assembly having a catalyst layer formed on each side of a polymer electrolyte membrane and two laminates (C) so that the catalyst layers of the membrane/catalyst assembly are in contact with the bonding and drainage layers of the laminates (C).

The microporous layer is formed by applying a microporous layer-forming coating liquid comprising carbon particles and, as the case requires, a binder, on the surface of a gas diffusing base material, followed by drying.

(Protective Layer-Forming Coating Liquid)

The protective layer-forming coating liquid comprises carbon fibers having an average fiber diameter of from 1 to 30 μm, a fluorinated ion exchange resin and a dispersing medium.

The dispersing medium may be an organic solvent or water, and a dispersing medium containing an alcohol and water is particularly preferred.

The alcohol may, for example, be a non-fluorinated alcohol (such as methanol, ethanol, 1-propanol or 2-propanol), or a fluorinated alcohol (such as 2,2,2-trifluoroethanol, 2,2,3,3,3-pentafluoro-1-propanol, 2,2,3,3-tetrafluoro-1-propanol, 4,4,5,5,5-pentafluoro-1-pentanol, 1,1,1,3,3,3-hexafluoro-2-propanol, 3,3,3-trifluoro-1-propanol, 3,3,4,4,5,5,6,6,6-nonafluoro-1-hexanol or 3,3,4,4,5,5,6,6,7,7,8,8,8-tridecafluoro-1-octanol. Further, as a fluoro compound solvent, 2,2,3,3,3-pentafluoropropyl methyl ether, 2,2,3,3,3-pentafluoropropyl fluoromethyl ether or 1,1,3,3,3-pentafluoro-2-trifluoromethylpropyl methyl ether may, for example, be used.

The dispersing medium preferably contains a fluorinated solvent, since it is thereby possible to maintain the dispersed state of carbon fibers for a long period of time.

The fluorinated solvent may, for example, be a fluorinated aliphatic compound (such as 1,1,2,2,3,3,4-heptafluorocyclopentane, 1,3-dichloro-1,1,2,2,3-pentafluoropropane, 1,1-dichloro-2,2,3,3,3-pentafluoropropane, 1,1,1,2,3,4,4,5,5,5-decafluoropentane or 1,1,1-trichloro-2,2,3,3,3-pentafluoropropane) or the above-mentioned fluorinated alcohol, and from such a viewpoint that it is possible to maintain the dispersed state of carbon fibers for a long period of time, it is particularly preferably 1,1,2,2,3,3,4-heptafluoropentane or 2,2,3,3,3-pentafluoro-1-propanol.

The proportion of the alcohol is preferably from 40 to 80 mass %, more preferably from 50 to 70 mass %, based on 100 mass % of the dispersing medium. If the proportion of the alcohol exceeds 80 mass %, the viscosity of the coating liquid tends to be so large that it becomes difficult to apply it uniformly, thus leading to a problem such that the layer formed by using such a coating liquid becomes non-uniform, or inflammation is likely to occur during the drying step after the application. If the proportion of the alcohol is less than 40 mass %, it tends to be difficult to uniformly mix it with the remaining dispersant component (such as water, or a fluorinated solvent), and the dispersed state of carbon fibers is likely to be deteriorated to cause non-uniformity in the coated layer formed by using such a coating liquid.

The proportion of water is preferably from 5 to 40 mass %, more preferably from 10 to 30 mass %, in 100 mass % of the dispersing medium. If the proportion of water exceeds 40 mass %, the viscosity of the coating liquid cannot be made sufficiently high, and it becomes difficult to maintain the dispersion of carbon fibers well. If the proportion of the water is less than 5 mass %, the viscosity of the coating liquid tends to be so high that it becomes difficult to apply it uniformly, thus leading to such a problem that the layer formed by using such a coating liquid becomes non-uniform, or inflammation is likely to occur in the drying step after the application.

The proportion of the fluorinated solvent is preferably from 2 to 40 mass %, more preferably from 10 to 30 mass %, in 100 mass % of the dispersing medium. When the proportion of the fluorinated solvent is at least 10 mass %, it is possible to maintain the dispersed state of carbon fibers for a long period of time. If the proportion of the fluorinated solvent is less than 10 mass %, it becomes difficult to increase the viscosity of the coating liquid, and it becomes difficult to maintain the dispersed state of carbon fibers for a long period of time.

The solid content concentration of the protective layer-forming coating liquid is preferably from 10 to 50 mass %, more preferably from 20 to 40 mass %, particularly preferably from 25 to 35 mass %. When the solid content concentration is at least 10 mass %, by adjusting the viscosity of the coating liquid by the composition of the dispersing medium, it becomes possible to form a layer of a coating liquid having a thickness of from 100 to 300 µm by one application. When the solid content concentration is at most 50 mass %, the dispersed state of carbon fibers can be maintained for a long period of time.

The solid content concentration of the protective layer-forming coating liquid is represented by the proportion of the sum of the mass of carbon fibers and the mass of the fluorinated ion exchange resin in the total mass of the coating liquid.

The protective layer-forming coating liquid may, for example, be prepared as follows.

The fluorinated ion exchange resin is dispersed in a part of the dispersing medium to prepare a dispersion of the fluorinated ion exchange resin.

Carbon fibers, the remaining dispersing medium and the above dispersion of the fluorinated ion exchange resin are mixed to obtain a mixed liquid. The mixed liquid is stirred to disperse the carbon fibers in the dispersing medium to obtain a gas diffusion layer-forming coating liquid.

At the time of stirring the mixed liquid, it is preferred to employ a homogenizer, a beads mill or the like, whereby the carbon fibers will be adjusted to a proper length, and the dispersibility will thereby be improved.

(Bonding and Drainage Layer-Forming Coating Liquid)

The bonding and drainage layer-forming coating liquid comprises carbon fibers having an average fiber diameter of from 1 to 200 nm, an ion exchange resin and a dispersing medium.

The ion exchange resin is preferably a fluorinated ion exchange resin.

The dispersing medium may be an organic solvent or water, and a dispersing medium containing an alcohol and water is particularly preferred.

The alcohol may be an alcohol which may be used for the above-described protective layer-forming coating liquid.

The proportion of the alcohol is preferably from 10 to 90 mass %, more preferably from 30 to 70 mass %, in 100 mass % of the dispersing medium.

The proportion of water is preferably from 10 to 90 mass %, more preferably from 30 to 70 mass %, in 100 mass % of the dispersing medium. It is particularly preferred that the proportion of the alcohol is from 30 to 70 mass %, and the proportion of water is from 30 to 70 mass %, in 100 mass % of the dispersing medium, whereby the coating properties and dispersion stability are remarkably improved. Further, when the solvent composition is in such a range, it is possible to prepare a dispersion wherein the solid content concentration is 30 mass % at the maximum, such being desirable.

Further, a fluorinated solvent may be added as a dispersing medium.

Such a fluorinated solvent may be a fluorinated solvent which may be used for the above-described protective layer-forming coating liquid. As such a fluorinated solvent, 1,1,2,2,3,3,4-heptafluorocyclopentane or 2,2,3,3,3-pentafluoro-1-propanol is particularly preferred. By adding a fluorinated solvent to the dispersing medium, it is possible to adjust the viscosity and dispersion stability of the dispersion.

In the above-described membrane/electrode assembly 10, the cathode 20 and the anode 30 have a protective layer between a catalyst layer and a gas diffusion layer, whereby it is possible to prevent by the protective layer such a physical damage that carbon fibers constituting the gas diffusion layer pierce into the polymer electrolyte membrane 40. It is thereby possible to prevent shortcircuiting of the membrane/electrode assembly 10 thereby to further improve the durability of the membrane/electrode assembly 10. Further, by virtue of the protecting layer, flooding is less likely to occur.

<Polymer Electrolyte Fuel Cell>

The membrane/electrode assembly of the present invention is used for a polymer electrolyte fuel cell. The polymer electrolyte fuel cell is, for example, one wherein cells each comprising the membrane/electrode assembly and a pair of separators disposed so that the membrane/electrode assembly is interposed between them, are stacked so that the membrane/electrode assemblies and the separators are alternately disposed.

A separator is one having a plurality of grooves formed to constitute gas flow paths on each side.

The separators may be separators made of various electrically conductive materials, such as separators made of metal, separators made of carbon, or separators made of a mixed material of graphite and a resin.

Types of the polymer electrolyte fuel cell may, for example, be a hydrogen/oxygen type fuel cell, a direct methanol type fuel cell (DMFC), etc.

EXAMPLES

Now, the present invention will be described in detail with reference to Examples, but it should be understood that the present invention is by no means restricted by these Examples.

Examples 1 to 9 are Working Examples of the present invention, and Examples 10 to 14 are Comparative Examples.

(Average Fiber Diameter)

The average fiber diameter of carbon fibers contained in each coating liquid was obtained in such a manner that the coating liquid was applied on a PET film by an applicator and dried to form a coating layer having a thickness of from 50 to 100 µm (a protective layer or a bonding and drainage layer), and then, the coating layer has observed by a microscope (Digital microscope VHX-900, manufactured by KEYENCE CORPORATION), whereby fiber diameters of 30 carbon fibers randomly selected from the microscope image, were measured and averaged.

The average fiber diameter of carbon fibers contained in each layer is the same as the average fiber diameter of carbon fibers contained in the coating liquid to form such a layer.

(Effect to Prevent Shortcircuiting)

Two laminates (A) or laminates (B) of 5 cm×5 cm and one polymer electrolyte membrane of 6 cm×6 cm×thickness 30 µm (membrane of a perfluorocarbon polymer having sulfonic acid groups, tradename: Flemion, manufactured by Asahi Glass Company, Limited, ion exchange capacity: 1.1 meq/g dry resin) were prepared. The polymer electrolyte membrane was sandwiched between the two laminates (A) or the two laminates (B) so that the protective layers of the laminates (A) or the bonding and drainage layers of the laminates (B) were in contact with the polymer electrolyte membrane, and while a voltage of 50 mV was applied between the two laminates (A) or between the two laminates (B), a pressure of 3 MPa was uniformly applied from the outside of the laminates (A) or the laminates (B), whereby the shortcircuiting current density (mA/cm$^2$) was obtained. The effect to prevent shortcircuiting was judged by the following standards.

○: The shortcircuiting current density is less than 0.01 mA/cm$^2$.

Δ: The shortcircuiting current density is at least 0.01 mA/cm$^2$ and less than 0.05 mA/cm$^2$.

×: The shortcircuiting current density is at least 0.05 mA/cm$^2$.

(Adhesion)

The interface between the catalyst layer and the protective layer or bonding and drainage layer of the membrane/electrode assembly was observed and judged by the following standards.

○: The catalyst layer and the protective layer or bonding and drainage layer are sufficiently adhered, and no peeling at the interface is observed.

Δ: The catalyst layer and the protective layer or bonding and drainage layer are adhered, but a portion of the protective layer or bonding and drainage layer is peeled from the catalyst layer at a part of the interface.

×: The catalyst layer and the protective layer or bonding and drainage layer are not adhered, and peeling is likely at the interface.

(Effect to Prevent Flooding)

The membrane/electrode assembly is assembled into a cell for power generation, and under atmospheric pressure, hydrogen (utilization ratio: 70%)/air (utilization ratio: 40%) was supplied, whereby at a cell temperature of 80° C., the cell voltage at the initial stage of the operation was measured at current densities of 0.2 A/cm$^2$ and 1.5 A/cm$^2$ to confirm the degree of a decrease of the voltage by flooding. Here, on the anode side, hydrogen with a dew point of 80° C. was supplied, and on the cathode side, air with a dew point of 80° C. was supplied.

Example 1

Polymer (H1) (ion exchange capacity: 1.1 meq/g dry resin) comprising units based on TFE and repeating units represented by the following formula (11), was dispersed in a mixed dispersing medium of ethanol and water (ethanol/water=60/40 (mass ratio)) to prepare a dispersion of polymer (H1) having a solid content concentration of 28 mass %.

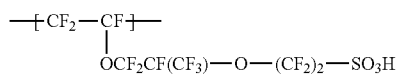
(11)

To 10 g of carbon fibers (MLD30 manufactured by Toray Industries, Inc., fiber diameter: 7 μm, fiber length: 30 μm), 17.2 g of ethanol, 5.2 g of distilled water and 3.6 g of the dispersion of polymer (H1) were added and stirred, followed by mixing and dispersing by means of a homogenizer. Further, 6.3 g of 1,1,2,2,3,3,4-heptafluorocyclopentane (ZEORORA H, manufactured by Nippon Zeon Co., Ltd.) was added, followed by mixing and dispersing by means of a homogenizer to obtain a protective layer-forming coating liquid. With respect to the protective layer-forming coating liquid, the composition of the dispersing medium, F/C, the solid content concentration, and the average fiber diameter of carbon fibers, are shown in Table 1.

The protective layer-forming coating liquid was applied by a die coater on the surface of a commercial gas diffusing base material (H2315 T10A, manufactured by NOK Corporation, no microporous layer) and dried at 80° C. for 20 minutes to form a protective layer having a thickness of 10 μm thereby to obtain a laminate (A) comprising a gas diffusion layer and a protective layer. With respect to the protective layer, the average fiber diameter of carbon fibers, F/C and the thickness are shown in Table 2. Further, with respect to the laminate (A), the result of evaluation of the effect to prevent, shortcircuiting is shown in Table 2.

A membrane/catalyst layer assembly wherein a catalyst layer having a thickness of 5 μm (amount of platinum: 0.2 mg/cm$^2$) was formed on each side of a polymer electrolyte membrane having a thickness of 25 μm (membrane of a perfluorocarbon polymer having sulfonic acid groups, tradename: Flemion, manufactured by Asahi Glass Company, Limited, ion exchange capacity: 1.1 meq/g dry resin) was prepared.

The membrane/catalyst layer assembly and two laminates (A) were bonded by a hot press method at a press temperature of 130° C. under a pressing pressure of 2 MPa so that the catalyst layers of the membrane/catalyst layer assembly were in contact with the protective layers of the laminates (A) to obtain a membrane/electrode assembly of a structure as shown in FIG. 1 having an electrode area of 25 cm$^2$. With respect to the membrane/electrode assembly, the results of evaluation of the adhesion and the effect to prevent flooding are shown in Table 2.

Example 2

To 10 g of carbon fibers (Dialead K223QM, manufactured by Mitsubishi Plastics, Inc., fiber diameter: 11 μm, fiber length: 57 μm), 17.2 g of ethanol, 5.2 g of distilled water and 3.6 g of the dispersion of polymer (H1) in Example 1 were added and stirred, followed by mixing and dispersing by means of a homogenizer. Further, 6.3 g of 1,1,2,2,3,3,4-heptafluorocyclopentane (ZEORORA H, manufactured by Nippon Zeon Co., Ltd.) was added, followed by mixing and dispersing by means of a homogenizer to obtain a protective layer-forming coating liquid. With respect to the protective layer-forming coating liquid, the composition of the dispersing medium, F/C, the solid content concentration and the average fiber diameter of carbon fibers are shown in Table 1.

The protective layer-forming coating liquid was applied using a die coater on the surface of a commercial gas diffusing base material (H2315 T10A, manufactured by NOK Corporation, no microporous layer) and dried at 80° C. for 20 minutes to form a protective layer having a thickness of 100 μm thereby to obtain a laminate (A) comprising a gas diffusion layer and a protective layer. With respect to the protective layer, the average fiber diameter of carbon fibers, F/C and the thickness are shown in Table 2. Further, with respect to the laminate (A), the result of evaluation of the effect to prevent shortcircuiting is shown in Table 2.

In the same manner as in Example 1 except that such a laminate (A) was used, a membrane/electrode assembly of a structure as shown in FIG. 1 having an electrode area of 25 cm$^2$ was obtained. With respect to such a membrane/electrode assembly, the results of evaluation of the adhesion and the effect to prevent flooding are shown in Table 2.

Example 3

The protective layer-forming coating liquid in Example 2 was applied by a die coater on the surface of a commercial gas diffusing base material (H2315 T10A, manufactured by NOK Corporation, no microporous layer) and dried at 80° C. for 20 minutes to form a protective layer having a thickness of 30 μm thereby to obtain a laminate (A) comprising a gas diffusion layer and a protective layer. With respect to the protective layer, the average fiber diameter of carbon fibers, F/C and the thickness are shown in Table 2. Further, with respect to the laminate (A), the result of evaluation of the effect to prevent shortcircuiting is shown in Table 2.

In the same manner as in Example 1 except that such a laminate (A) was used, a membrane/electrode assembly of a structure as shown in FIG. 1 having an electrode area of 25 $cm^2$ was obtained. With respect to such a membrane/electrode assembly, the results of evaluation of the adhesion and the effect to prevent flooding are shown in Table 2.

Example 4

To 10 g of carbon fibers used in Example 2, 17.2 g of ethanol, 5.4 g of distilled water and 2.1 g of the dispersion of polymer (H1) in Example 1 were added and stirred, followed by mixing and dispersing by means of a homogenizer. Further, 6.0 g of 1,1,2,2,3,3,4-heptafluorocyclopentane (ZEORORA H, manufactured by Nippon Zeon Co., Ltd.) was added, followed by mixing and dispersing by means of a homogenizer to obtain a protective layer-forming coating liquid. With respect to such a protective layer-forming coating liquid, the composition of the dispersing medium, F/C, the solid content concentration and the average fiber diameter of carbon fibers are shown in Table 1.

In the same manner as in Example 3 except that such a protective layer-forming coating liquid was used, a protective layer having a thickness of 30 μm was formed to obtain a laminate (A) comprising a gas diffusion layer and a protective layer. With respect to the protective layer, the average fiber diameter of carbon fibers, F/C and the thickness are shown in Table 2. Further, with respect to the laminate (A), the result of evaluation of the effect to prevent shortcircuiting is shown in Table 2.

In the same manner as in Example 1 except that such a laminate (A) was used, a membrane/electrode assembly of a structure as shown in FIG. 1 having an electrode area of 25 $cm^2$ was obtained. With respect to such a membrane/electrode assembly, the results of evaluation of the adhesion and the effect to prevent flooding are shown in Table 2.

Example 5

To 10 g of carbon fibers used in Example 2, 17.5 g of ethanol, 4.5 g of distilled water and 8.9 g of the dispersion of polymer (H1) in Example 1 were added and stirred, followed by mixing and dispersing by means of a homogenizer. Further, 7.1 g of 1,1,2,2,3,3,4-heptafluorocyclopentane (ZEORORA H, manufactured by Nippon Zeon Co., Ltd.) was added, followed by mixing and dispersing by means of a homogenizer to obtain a protective layer-forming coating liquid. With respect to such a protective layer-forming coating liquid, the composition of the dispersing medium, F/C, the solid content concentration and the average fiber diameter of carbon fibers are shown in Table 1.

In the same manner as in Example 3 except that such a protective layer-forming coating liquid was used, a protective layer having a thickness of 30 μm was formed to obtain a laminate (A) comprising a gas diffusion layer and a protective layer. With respect to the protective layer, the average fiber diameter of carbon fibers, F/C and the thickness are shown in Table 2. Further, with respect to the laminate (A), the result of evaluation of the effect to prevent shortcircuiting is shown in Table 2.

In the same manner as in Example 1 except that such a laminate (A) was used, a membrane/electrode assembly of a structure as shown in FIG. 1 having an electrode area of 25 $cm^2$ was obtained. With respect to such a membrane/electrode assembly, the results of evaluation of the adhesion and the effect to prevent flooding are shown in Table 2.

Example 6

The protective layer-forming coating liquid in Example 1 was applied by a die coater on the surface of a commercial gas diffusing base material (H2315 T10A, manufactured by NOK Corporation, no microporous layer) and dried at 80° C. for 20 minutes to form a protective layer having a thickness of 30 μm thereby to obtain a laminate (A) comprising a gas diffusion layer and a protective layer. With respect to the protective layer, the average fiber diameter of carbon fibers, F/C and the thickness are shown in Table 2. Further, with respect to the laminate (A), the result of evaluation of the effect to prevent shortcircuiting is shown in Table 2.

In the same manner as in Example 1 except that such a laminate (A) was used, a membrane/electrode assembly of a structure as shown in FIG. 1 having an electrode area of 25 $cm^2$ was obtained. With respect to such a membrane/electrode assembly, the results of evaluation of the adhesion and the effect to prevent flooding are shown in Table 2.

Example 7

To 10 g of carbon fibers grown in gas phase (VGCF-H manufactured by Showa Denko K.K., fiber diameter: 0.15 μm), 37.4 g of ethanol, 41.0 g of distilled water and 25.0 g of the dispersion of polymer (H1) in Example 1 were added and stirred, followed by mixing and dispersing by means of a homogenizer to obtain a bonding and drainage layer-forming coating liquid.

Such a bonding and drainage layer-forming coating liquid was applied by a die coater on the surface of an ETFE film Fluon ETFE 50 μm, manufactured by Asahi Glass Company, Limited) and dried at 80° C. for 30 minutes to form a bonding and drainage layer having a thickness of 10 μm. With respect to such a bonding and drainage layer, the average fiber diameter of carbon fibers, f/c and the thickness are shown in Table 2.

On the surface of such a bonding and drainage layer, the protective layer-forming coating liquid in Example 2 was applied by a die coater so that the thickness after drying would be 30 μm, then, a commercial gas diffusing base material (H2315 T10A, manufactured by NOK Corporation, no microporous layer) was placed on the coating liquid before drying the protective layer-forming coating liquid, and while a pressure of 1 kPa was uniformly applied, the coating liquid was dried at 80° C. for 30 minutes, whereupon the ETFE film was removed to obtain a laminate (B) comprising a gas diffusion layer, a protective layer and a bonding and drainage layer. With respect to the protective layer, the average fiber diameter of carbon fibers, F/C and the thickness are shown in Table 2. Further, with respect to the laminate (B), the result of evaluation of the effect to prevent shortcircuiting is shown in Table 2.

The membrane/catalyst layer assembly in Example 1 and two laminates (B) were bonded by a hot press method at a press temperature of 130° C. under a pressing pressure of 2 MPa so that the catalyst layers of the membrane/catalyst assembly in Example 1 were in contact with the bonding and drainage layers of the laminates (B), to obtain a membrane/electrode assembly of a structure as shown in FIG. 2 having an electrode area of 25 cm². With respect to such a membrane/electrode assembly, the results of evaluation of the adhesion and the effect to prevent flooding are shown in Table 2.

Example 8

On the surface of the bonding and drainage layer formed in the same manner as in Example 7, the protective layer-forming coating liquid in Example 2 was applied by a die coater so that the thickness after drying would be 25 µm, then, a commercial gas diffusing base material (H2315 T10C1, manufactured by NOK Corporation, having a microporous layer) was placed on the coating liquid before drying the protective layer-forming coating liquid, and while a pressure of 1 kPa was uniformly applied, the coating liquid was dried at 80° C. for 30 minutes, whereupon the ETFE film was removed to obtain a laminate (C) comprising a gas diffusion layer, a microporous layer, a protective layer and a bonding and drainage layer. With respect to the protective layer, the average fiber diameter of carbon fibers, F/C and the thickness are shown in Table 2. Further, with respect to the laminate (B), the result of evaluation of the effect to prevent shortcircuiting is shown in Table 2.

The membrane/catalyst layer assembly in Example 1 and two laminates (C) were bonded by a hot press method at a press temperature of 130° C. under a pressing pressure of 2 MPa so that the catalyst layers of the membrane/catalyst assembly in Example 1 were in contact with the bonding and drainage layers of the laminates (C), to obtain a membrane/electrode assembly of a structure as shown in FIG. 3 having an electrode area of 25 cm². With respect to such a membrane/electrode assembly, the results of evaluation of the adhesion and the effect to prevent flooding are shown in Table 2.

Further, by a membrane/electrode assembly prepared in the same manner as in Example 8 except that carbon fibers having an average fiber diameter of 13 µm are used as carbon fibers to be added to the protective layer-forming coating liquid, it is possible to obtain the same adhesion and effect to prevent flooding as by the membrane/electrode assembly in Example 8.

Further, also by a membrane/electrode assembly prepared in the same manner as in Example 8 except that carbon fibers having an average fiber diameter of 18 µm are used as the carbon fibers to be added to the protective layer-forming coating liquid, it is possible to obtain the same adhesion and effect to prevent flooding as by the membrane/electrode assembly in Example 8.

Example 9

The protective layer-forming coating liquid prepared in the same manner as in Example 1 was applied using a die coater on the surface of a commercial gas diffusing base material (H2315 T10AC1, manufactured by NOK Corporation, having a microporous layer) and dried at 80° C. for 20 minutes to form a protective layer having a thickness of 30 µm thereby to obtain a laminate (A) comprising a gas diffusion layer and a protective layer. Before drying the bonding and drainage layer formed in the same manner as in Example 7, the laminate (A) comprising the gas diffusion layer and the protective layer was placed, and while a pressure of 1 kPa was uniformly applied, the coating liquid was dried at 80° C. for 30 minutes, whereupon the ETFE film was removed to obtain a laminate (B) comprising a gas diffusion layer, a microporous layer, a protective layer and a bonding and drainage layer. With respect to the protective layer, the average fiber diameter of carbon fibers, F/C and the thickness are shown in Table 2.

The membrane/catalyst layer assembly in Example 1 and two laminates (C) were bonded by a hot press method at a press temperature of 130° C. under a pressing pressure of 2 MPa so that the catalyst layers of the membrane/electrode assembly in Example 1 were in contact with the bonding and drainage layers of the laminates (B), to obtain a membrane/electrode assembly of a structure as shown in FIG. 3 having an electrode area of 25 cm². With respect to such a membrane/electrode assembly, the results of evaluation of the adhesion and the effect to prevent flooding are shown in Table 2.

Example 10

To 10 g of carbon particles (Ketjen black EC, manufactured by AKZO Chemie), 17.6 g of ethanol, 0.6 g of distilled water and 10.7 g of the dispersion of polymer (H1) in Example 1 were added and stirred, followed by mixing and dispersing by means of a homogenier, and further, 11.1 g of 1,1,2,2,3,3,4-heptafluorocyclopentane (ZEORORA H, manufactured by Nippon Zeon Co., Ltd.) was added, followed by mixing and dispersing by means of a homogenizer to obtain a protective layer-forming coating liquid.

In the same manner as in Example 3 except that such a protective layer-forming coating liquid was used, a protective layer having a thickness of 30 µm was formed thereby to obtain a laminate (A) comprising a gas diffusion layer and a protective layer. With respect to the protective layer, the thickness is shown in Table 2. Further, with respect to the laminate (A), the results of evaluation of the effect to prevent shortcircuiting is shown in Table 2.

In the same manner as in Example 1 except that such a laminate (A) was used, a membrane/electrode assembly of a structure as shown in FIG. 1 having an electrode area of 25 cm² was obtained. With respect to such a membrane/electrode assembly, the results of evaluation of the adhesion and the effect to prevent flooding are shown in Table 2.

Example 11

To 10 g of carbon fibers grown in gas phase (VGCF-H manufactured by Showa Denko K.K., fiber diameter: 0.15 µm, fiber length: 10 to 20 µm), 17.2 g of ethanol, 5.2 g of distilled water and 3.6 g of the dispersion of polymer (H1) in Example 1 were added and stirred, followed by mixing and dispersing by means of a homogenizer, and further, 6.3 g of 1,1,2,2,3,3,4-heptafluorocyclopentane (ZEORORA H, manufactured by Nippon Zeon Co., Ltd.) was added, followed by mixing and dispersing by means of a homogenizer to obtain a protective layer-forming coating liquid. With respect to such a protective layer-forming coating layer, the composition of the dispersing medium, F/C, the solid content concentration and the average fiber diameter of carbon fibers are shown in Table 1.

In the same manner as in Example 3 except that such a protective layer-forming coating liquid was used, a protective layer having a thickness of 30 µm was formed thereby to obtain a laminate (A) comprising a gas diffusion layer and a protective layer. With respect to the protective layer, the average fiber diameter of carbon fibers, F/C and the thickness are shown in Table 2. Further, with respect to the laminate (A), the result of evaluation of the effect to prevent shortcircuiting is shown in Table 2.

In the same manner as in Example 1 except that such a laminate (A) was used, a membrane/electrode assembly of a structure as shown in FIG. 1 having an electrode area of 25 cm² was obtained. With respect to such a membrane/electrode assembly, the results of evaluation of the adhesion and the effect to prevent flooding are shown in Table 2.

Example 12

In the same manner as in Example 7 in JP-A-2007-157736, a gas diffusion slurry comprising PTFE, PAN-type carbon fibers (MLD-300, manufactured by Toray Industries, Inc., fiber diameter: 7 μm, fiber length: 130 μm) and a solvent of water/ethanol=1/2, was prepared. PTFE was mixed in an amount of 40 mass %.

Such a gas diffusion slurry was applied by a spray on the surface of a commercial gas diffusing base material (H2315 T10A, manufactured by NOK Corporation, no microporous layer) and dried at 80° C. for 20 minutes to form a protective layer having a thickness of 30 μm thereby to obtain a laminate (A) comprising a gas diffusion layer and a protective layer.

With respect to the protective layer, the thickness is shown in Table 2. Further, with respect to the laminate (A), the result of evaluation of the effect to prevent shortcircuiting is shown in Table 2.

In the same manner as in Example 1 except that such a laminate (A) was used, a membrane/electrode assembly of a structure as shown in FIG. 1 having an electrode area of 25 cm² was obtained. With respect to such a membrane/electrode assembly, the results of evaluation of the adhesion and the effect to prevent flooding are shown in Table 2.

Example 13

To 10 g of carbon fibers used in Example 2, 19.3 g of ethanol, 3.9 g of distilled water and 17.9 g of the dispersion of polymer (H1) in Example 1 were added and stirred, followed by mixing and dispersing by means of a homogenizer. Further, 9.0 g of 1,1,2,2,3,3,4-heptafluorocyclopentane (ZEORORA H, manufactured by Nippon Zeon Co., Ltd.) was added, followed by mixing and dispersing by means of a homogenizer to obtain a protective layer-forming coating liquid. With respect to such a protective layer-forming coating layer, the composition of the dispersing medium, F/C, the solid content concentration and the average fiber diameter of carbon fibers are shown in Table 1.

In the same manner as in Example 3 except that such a protective layer-forming coating liquid was used, a protective layer having a thickness of 30 μm was formed thereby to obtain a laminate (A) comprising a gas diffusion layer and a protective layer. With respect to the protective layer, the average fiber diameter of carbon fibers, F/C and the thickness are shown in Table 2. Further, with respect to the laminate (A), the result of evaluation of the effect to prevent shortcircuiting is shown in Table 2.

In the same manner as in Example 1 except that such a laminate (A) was used, a membrane/electrode assembly of a structure as shown in FIG. 1 having an electrode area of 25 cm² was obtained. With respect to such a membrane/electrode assembly, the results of evaluation of the adhesion and the effect to prevent flooding are shown in Table 2.

Example 14

To 10 g of carbon fibers used in Example 2, 14.0 g of ethanol, 4.6 g of distilled water and 0.36 g of the dispersion of polymer (H1) in Example 1 were added and stirred, followed by mixing and dispersing by means of a homogenizer. Further, 4.7 g of 1,1,2,2,3,3,4-heptafluorocyclopentane (ZEORORA H, manufactured by Nippon Zeon Co., Ltd.) was added, followed by mixing and dispersing by means of a homogenizer, but it was not possible to prepare a protective layer-forming coating liquid because of poor dispersion. With respect to the liquid with which preparation of a protective layer-forming coating liquid was attempted, the composition of the dispersing medium, F/C, the solid content concentration and the average fiber diameter of carbon fibers are shown in Table 1.

TABLE 1

| | | Protective layer-forming coating liquid | | | | | | | | | | | | | |
|---|---|---|---|---|---|---|---|---|---|---|---|---|---|---|---|
| | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 |
| Composition of dispersing medium (mass %) | Fluorinated solvent | 20 | 20 | 20 | 20 | 20 | 20 | 20 | 20 | 20 | 30 | 20 | 0 | 20 | 30 |
| | Ethanol | 60 | 60 | 60 | 60 | 60 | 60 | 60 | 60 | 60 | 60 | 60 | 67 | 60 | 60 |
| | Water | 20 | 20 | 20 | 20 | 20 | 20 | 20 | 20 | 20 | 10 | 20 | 33 | 20 | 10 |
| F/C | | 0.10 | 0.10 | 0.06 | 0.25 | 0.10 | 0.10 | 0.10 | 0.10 | 0.10 | — | 0.10 | — | 0.50 | 0.01 |
| Solid content concentration (mass %) | | 26 | 26 | 26 | 26 | 26 | 26 | 26 | 26 | 26 | 26 | 26 | 10 | 25 | 30 |
| Average fiber diameter of CF (μm) | | 7 | 11 | 11 | 11 | 11 | 7 | 11 | 11 | 11 | — | 0.15 | 7 | 11 | 11 |

CF: Carbon fibers

TABLE 2

| | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Protective layer | | | | | | | | | |
| Average fiber diameter of CF (μm) | 7 | 11 | 11 | 11 | 11 | 7 | 11 | 11 | 11 |
| F/C | 0.10 | 0.10 | 0.06 | 0.25 | 0.10 | 0.10 | 0.10 | 0.10 | 0.10 |
| Thickness (μm) | 10 | 100 | 30 | 30 | 30 | 30 | 30 | 25 | 25 |
| Bond drainage layer | | | | | | | | | |
| Average fiber diameter of CF (μm) | — | — | — | — | — | — | 0.15 | 0.15 | 0.15 |
| F/C | — | — | — | — | — | — | 0.7 | 0.7 | 0.7 |
| Thickness (μm) | — | — | — | — | — | — | 10 | 10 | 10 |

TABLE 2-continued

| | | | | | Microporous layer | | | | | |
|---|---|---|---|---|---|---|---|---|---|---|
| Present or absent | | Absent | Absent | Absent | Absent | Absent | Absent | Absent | Present | Present |
| | | | | | Evaluation | | | | | |
| Effect to prevent shortcircuiting | | Δ | ○ | ○ | ○ | ○ | ○ | ○ | ○ | ○ |
| Adhesion | | Δ | Δ | Δ | Δ | Δ | Δ | ○ | ○ | ○ |
| Effect to prevent flooding | 0.2 A/cm² | 0.78 | 0.78 | 0.78 | 0.78 | 0.78 | 0.78 | 0.78 | 0.78 | 0.78 |
| | 1.5 A/cm² | 0.56 | 0.55 | 0.57 | 0.57 | 0.54 | 0.56 | 0.57 | 0.57 | 0.57 |

| | | Ex. 10 | Ex. 11 | Ex. 12 | Ex. 13 | Ex. 14 |
|---|---|---|---|---|---|---|
| | | | Protective layer | | | |
| Average fiber diameter of CF (μm) | | — | 0.15 | 7 | 11 | 11 |
| F/C | | — | 0.10 | — | 0.50 | 0.01 |
| Thickness (μm) | | 25 | 30 | 30 | 30 | 30 |
| | | | Bond drainage layer | | | |
| Average fiber diameter of CF (μm) | | — | — | — | — | — |
| F/C | | — | — | — | — | — |
| Thickness (μm) | | — | — | — | — | — |
| | | | Microporous layer | | | |
| Present or absent | | Absent | Absent | Absent | Absent | Absent |
| | | | Evaluation | | | |
| Effect to prevent shortcircuiting | | X | X | Δ | ○ | — |
| Adhesion | | Δ | Δ | X | Δ | — |
| Effect to prevent flooding | 0.2 A/cm² | 0.77 | 0.78 | 0.77 | 0.78 | — |
| | 1.5 A/cm² | 0.50 | 0.56 | 0.54 | 0.45 | — |

CF: Carbon fibers

Examples 2 to 9 had a protective layer having a sufficient thickness and containing carbon fibers with an average fiber diameter of from 1 to 30 μm and thus were excellent in the effect to prevent shortcircuiting. In Example 1, the thickness of the protective layer was thin, and the effect to prevent shortcircuiting was slightly inferior.

In Examples 3, 4, 7, 8 and 9, the protective layer had a proper thickness, and the carbon fibers had a proper average fiber diameter, and F/C was adjusted in a proper range, whereby the effect to prevent flooding was excellent. In Examples 1 and 6, the average fiber diameter of carbon fibers was thin, the protective layer became dense, whereby the effect to prevent flooding was slightly inferior. In Example 2, the protective layer was thick, and the effect to prevent flooding was slightly inferior. In Example 5, F/C was large, whereby the effect to prevent flooding was slightly inferior.

Examples 7, 8 and 9 had a bonding and drainage layer, and thus were excellent also in the adhesion.

In Example 10, carbon particles were used instead of carbon fibers, whereby the effect to prevent shortcircuiting and the effect to prevent flooding were inferior.

In Example 11, the average fiber diameter of carbon fibers was too thin, whereby the effect to prevent shortcircuiting was substantially inferior, and the effect to prevent flooding was slightly inferior. Further, since the value of F/C was small, the adhesion was slightly inferior.

In Example 12, the protective layer contained PTFE instead of the fluorinated ion exchange resin, whereby the adhesion was substantially inferior. The average fiber diameter of the carbon fibers was thin, whereby the effect to prevent shortcircuiting and the effect to prevent flooding were slightly inferior.

In Example 13, F/C was too large, whereby the effect to prevent flooding was substantially inferior.

F/C of the protective layer-forming coating liquid in Example 14 was too small, whereby the carbon fibers were not sufficiently dispersed, and it was not possible to employ it for the formation of a protective layer.

INDUSTRIAL APPLICABILITY

According to the present invention, it is possible to provide a membrane/electrode assembly which is less susceptible to shortcircuiting by piercing of carbon fibers of the gas diffusion layer into a polymer electrolyte membrane, and thus, it is useful as a membrane/electrode assembly for polymer electrolyte fuel cells for e.g. stationary use or automobile use.

The entire disclosure of Japanese Patent Application No. 2008-150319 filed on Jun. 9, 2008 including specification, claims, drawings and summary is incorporated herein by reference in its entirety.

MEANINGS OF SYMBOLS

10: Membrane/electrode assembly
20: Cathode
22: Catalyst layer
24: Protective layer
26: Gas diffusion layer
28: Bonding and drainage layer
29: Microporous layer
30: Anode
32: Catalyst layer
34: Protective layer
36: Gas diffusion layer
38: Bond drainage layer
39: Microporous layer

What is claimed is:

1. A membrane/electrode assembly for a polymer electrolyte fuel cell, comprising:
   a cathode having a catalyst layer and a gas diffusion layer,
   an anode having a catalyst layer and a gas diffusion layer, and
   a polymer electrolyte membrane interposed between the catalyst layer of the cathode and the catalyst layer of the anode, wherein
   each of the cathode and the anode further has a protective layer comprising carbon fibers having an average fiber diameter of from 1 to 30 μm and a fluorinated ion exchange resin, between the catalyst layer and the gas diffusion layer, and
   the mass ratio (F/C) of the fluorinated ion exchange resin (F) to the carbon fibers (C) contained in the protective layer is from 0.05 to 0.30.

2. The membrane/electrode assembly for a polymer electrolyte fuel cell according to claim 1, wherein the protective layer has a thickness of from 15 to 80 μm.

3. The membrane/electrode assembly for a polymer electrolyte fuel cell according to claim 1, wherein the fluorinated ion exchange resin contained in the protective layer has an ion exchange capacity of from 0.5 to 2.0 meq/g dry resin.

4. The membrane/electrode assembly for a polymer electrolyte fuel cell according to claim 1, wherein the fluorinated ion exchange resin contained in the protective layer is a perfluoropolymer having ion exchange groups.

5. The membrane/electrode assembly for a polymer electrolyte fuel cell according to claim 1, wherein at least one of the cathode and the anode further has a bond drainage layer comprising carbon fibers having an average fiber diameter of from 1 to 200 nm between the catalyst layer and the protective layer.

6. The membrane/electrode assembly for a polymer electrolyte fuel cell according to claim 5, wherein the bond drainage layer has a thickness of from 2 to 15 μm.

7. The membrane/electrode assembly for a polymer electrolyte fuel cell according to claim 5, wherein the bond drainage layer further contains a fluorinated ion exchange resin.

8. The membrane/electrode assembly for a polymer electrolyte fuel cell according to claim 7, wherein the mass ratio (f/c) of the fluorinated ion exchange resin (f) to the carbon fibers (c) contained in the bond drainage layer is from 0.05 to 2.

9. The membrane/electrode assembly for a polymer electrolyte fuel cell according to claim 1, wherein at least one of the cathode and the anode further has a microporous layer comprising carbon particles, between the protective layer and the gas diffusion layer.

* * * * *